Dec. 13, 1938.　　　F. M. POTTER　　　2,140,270
ELECTRIC CABLE
Filed Dec. 1, 1934

INVENTOR
Frank M. Potter
BY
Emery, Booth, Varney & Whittemore
ATTORNEYS

Patented Dec. 13, 1938

2,140,270

UNITED STATES PATENT OFFICE 2,140,270

ELECTRIC CABLE

Frank M. Potter, Rome, N. Y., assignor to General Cable Corporation, New York, N. Y., a corporation of New Jersey Application December 1, 1934, Serial No. 755,537

3 Claims. (Cl. 173—267)

This invention relates to electric cables and has for an object the provision of improvements in this art. More particularly, it is one of the objects of the invention to provide a protective separation between a metallic armor and a metallic conductor disposed interiorly thereof. Other objects will appear as the invention is disclosed.

The principles of the invention will be explained by reference to a few illustrative embodiments thereof shown in the accompanying drawing wherein.

Figure 1:
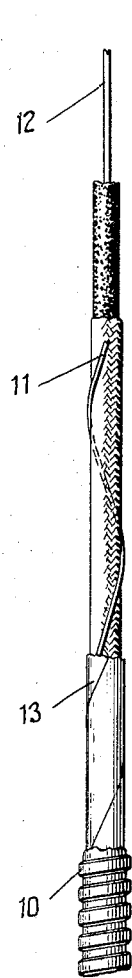
Fig. 1 is a side view of one type of a single insulated conductor cable embodying the invention, the outer layers being successively cut back to show the interior construction.
Figure 2:
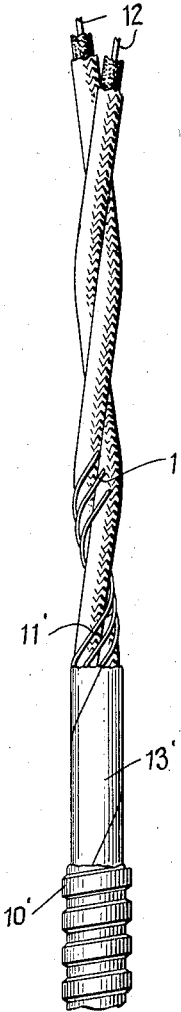
Fig. 2 is a side view of a plural insulated conductor cable of the same general type as that shown in Fig. 1.
Figure 3:
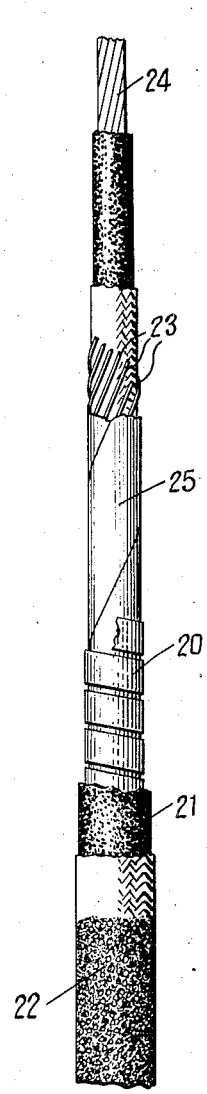
Fig. 3 is a side view of another type of single insulated conductor cable embodying the invention.
Figure 4:
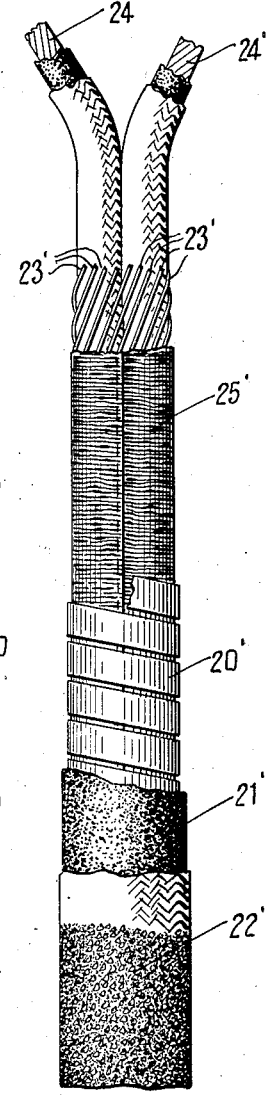
Fig. 4 is a side view of a plural insulated conductor cable of the same type as that shown in Fig. 3.

Electric cables having a metallic armor have long been employed for one purpose or another. One well known type is that used for house wiring, usually referred to as BX cable, which is covered by a spiral wrapping of steel strip which is overlapped and interlocked at its edges, as shown at 10 and 10' in Figs. 1 and 2, respectively. There are various other types of armored cables and one of these is shown in Figs. 3 and 4, this one comprising a spiral wrapping of metal strip 20, 20', the edges of which are parallel, the armor in this type being enclosed by an outer non-metallic covering which here comprises a rubberized tape 21, 21' and a flame retarding and moisture resisting fabric braid 22, 22'.

Where conditions permit or justify, cables are made with one or more uninsulated or bare conductors—11 and 11' in Figs. 1, 2 and 23, 23' in Figs. 3, 4—in addition to the insulated conductors—12, 12' in Figs. 1, 2 and 24, 24' in Figs. 3, 4.

One purpose of using a bare wire is to reduce the overall size of the cable. Another purpose is to insure electrical continuity where the metal armor is used as a ground or neutral, the bare wire in the latter case heretofore being laid in direct contact with the armor so as to bridge any gaps which may be present in the convolutions of the armor due to breakage, corrosion or other causes. The armor is usually wrapped tightly over the bare wire to insure good contact and make a tight assembly.

The present invention is in part founded upon the discovery that the edges of the armor tape frequently make nicks in the bare wire where it crosses. When such nicks are formed and the cable is bent, or when the ends of the bare wire are bent in making connections, the wire is likely to be broken, thus defeating the purpose of using it.

According to the present invention the possibility of injuring the bare wire or wires is avoided by placing a layer of protective material—13, 13' in Figs. 1 and 2 and 25, 25' in Figs. 3 and 4—between the wire and the armor. The principal construction to which the present invention applies is that in which the bare wires are wound spirally over the insulated conductors but is applicable also to a construction where the bare wire lies in the valleys if it is kinked or bent so as to be exposed beyond the outer surfaces of the insulated conductor assembly where it would normally be subject to abrasion by the spiral armor. Any suitable material may be used, that illustrated herein being paper which is wrapped in overlapping fashion over the bare wire before the metal tape is applied. The paper may be of either smooth or crinkled type and be wrapped straight, as shown in Fig. 4, or spirally, as shown in the other figures, depending on the requirements of the cable.

Besides furnishing mechanical protection, this layer serves to keep the bare wires clean by excluding oil, dirt and other objectionable substances so that the ends may be easily and effectively connected. In BX type cables the objectionable matter is usually oil and dirt which come through the armor joints but in cables like that shown in Figs. 3 and 4 the objectionable matter may consist of the rubber of the cover or of the penetrating compounds of the outer layers which are driven inward when the cable is subjected to heat during its manufacture. Moreover, the protective layer serves as a dielectric separation between the wire, which usually is of non-ferrous material such as copper, and the metal armor, which usually is of ferrous material. This prevents electrolytic action between the two metals which might occur should the cable be exposed to dampness.

For most purposes the bare wire or wires will have the same current carrying capacity as each of the other conductors. In Figs. 2, 3 and 4 there are a number of bare wires and they are separated in order to make a neat compact assembly but their combined capacity is approximately the same as that of one of the insulated conductors. Instead of being entirely bare, the wire may have an enamel or other thin coating which is subject to injury and still utilize some of the advantages of the present invention.

The invention is subject to certain modifications within the scope of the subjoined claims.

I claim:

1. An armored electrical cable comprising in combination, an insulated conductor, an uninsulated conductor serving as a ground or neutral wound spirally around the insulated conductor so as to be exposed and project beyond the outer surface of the same substantially throughout the length of the cable, a spirally wound metal armor having its convolutions crossing and pressing against those of the uninsulated conductor, and a thin insulating layer between the armor and the uninsulated conductor serving to keep them from contact with each other at all points, the layer being sufficiently thick and tough to prevent injury to the uninsulated conductor by the spiral armor where its convolutions cross and press upon the conductor, and being sufficiently continuous and impervious to keep the conductor free from substances which would interfere with the making of efficient electrical connections.

2. An armored electrical cable comprising in combination, a plurality of insulated conductors, an uninsulated conductor serving as a ground or neutral assembled with the insulated conductors so as to be exposed and project beyond the outer surface of the same substantially throughout the length of the cable, a spirally wound metal armor having its convolutions crossing and pressing against the uninsulated conductor, and a thin insulating layer between the armor and the uninsulated conductor serving to keep them from contact with each other at all points, the layer being sufficiently thick and tough to prevent injury to the uninsulated conductor by the spiral armor where its convolutions cross and press upon the conductor, and being sufficiently continuous and impervious to keep the conductor free from substances which would interfere with the making of efficient electrical connections.

3. An armored electrical cable, comprising in combination, a plurality of insulated conductors provided with a rubber and braid covering, a plurality of uninsulated conductors serving as a ground or neutral wound spirally around the insulated conductors so as to be exposed and project beyond the outer surface of the same substantially throughout the length of the cable, a spirally wound metal armor having its convolutions crossing and pressing against those of the uninsulated conductors, a thin insulating layer of crinkled paper between the armor and the uninsulated conductors serving to keep them from contact from each other at all points, the layer being sufficiently thick and tough to prevent injury to the uninsulated conductors by the spiral armor where its convolutions cross and press upon the conductors, and being sufficiently continuous and impervious to keep the conductors clean for connecting purposes, a rubberized tape covering over the armor, and an impregnated textile braid over the whole.

FRANK M. POTTER.